(12) United States Patent
Lee et al.

(10) Patent No.: US 8,184,425 B2
(45) Date of Patent: May 22, 2012

(54) MULTILAYER CAPACITOR

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 793 days.

(21) Appl. No.: 12/238,796

(22) Filed: Sep. 26, 2008

(65) Prior Publication Data

US 2009/0086406 A1    Apr. 2, 2009

(30) Foreign Application Priority Data

Sep. 28, 2007    (KR) .................. 10-2007-0098299

(51) Int. Cl.
*H01G 4/228* (2006.01)
*H01G 4/005* (2006.01)
*H01G 4/20* (2006.01)

(52) U.S. Cl. ............... 361/306.3; 361/303; 361/309; 361/313; 361/306.1

(58) Field of Classification Search .......... 361/303, 361/306.3, 306.1, 313, 309
See application file for complete search history.

(56) References Cited

U.S. PATENT DOCUMENTS

| | | | |
|---|---|---|---|
| 5,880,925 A | 3/1999 | DuPre et al. | |
| 6,407,906 B1 * | 6/2002 | Ahiko et al. | 361/306.1 |
| 6,441,459 B1 | 8/2002 | Togashi et al. | |
| 6,765,781 B2 | 7/2004 | Togashi | |
| 6,972,942 B2 * | 12/2005 | Ritter et al. | 361/306.3 |
| 7,054,134 B2 | 5/2006 | Togashi et al. | |
| 7,145,429 B1 * | 12/2006 | Togashi et al. | 336/200 |
| 2003/0102502 A1 * | 6/2003 | Togashi | 257/303 |
| 2003/0231457 A1 * | 12/2003 | Ritter et al. | 361/306.3 |
| 2004/0223290 A1 * | 11/2004 | Sutardja | 361/306.3 |
| 2006/0120017 A1 * | 6/2006 | Togashi | 361/306.3 |
| 2006/0139849 A1 | 6/2006 | Yoon et al. | |

(Continued)

FOREIGN PATENT DOCUMENTS

JP    2007-043093    2/2007

(Continued)

OTHER PUBLICATIONS

Korean Office Action issued in Korean Patent Application No. KR 10-2007-0098299, mailed Jan. 20, 2009.

*Primary Examiner* — Bradley Thomas
(74) *Attorney, Agent, or Firm* — McDermott Will & Emery LLP

(57) ABSTRACT

There is provided a multilayer capacitor including: a capacitor body where a plurality of dielectric layers are laminated, the capacitor body including first and second surfaces opposing each other in a laminated direction, wherein the first surface provides a mounting surface; a plurality of first and second inner electrodes; an inner connecting conductor; and a plurality of first and second outer electrodes formed on an outer surface of the body, wherein a corresponding one of the outer electrodes having identical polarity to the inner connecting conductor includes at least one outer terminal formed on the first surface of the body to connect to the inner connecting conductor, and at least one outer connecting conductor formed on the second surface of the body to connect a corresponding one of the inner electrodes of identical polarity to the inner connecting conductor.

35 Claims, 8 Drawing Sheets

U.S. PATENT DOCUMENTS

| | | | |
|---|---|---|---|
| 2006/0164789 A1* | 7/2006 | Togashi et al. | 361/306.3 |
| 2006/0187612 A1* | 8/2006 | Yamane et al. | 361/303 |
| 2006/0203420 A1* | 9/2006 | Okuyama | 361/271 |
| 2006/0203422 A1* | 9/2006 | Togashi | 361/303 |
| 2006/0203426 A1* | 9/2006 | Togashi et al. | 361/306.3 |
| 2006/0203427 A1* | 9/2006 | Togashi et al. | 361/306.3 |
| 2006/0209492 A1* | 9/2006 | Togashi | 361/303 |
| 2006/0279903 A1* | 12/2006 | Togashi et al. | 361/303 |
| 2007/0019364 A1* | 1/2007 | Roy | 361/303 |
| 2007/0025053 A1* | 2/2007 | Takahashi | 361/303 |
| 2007/0047176 A1* | 3/2007 | Togashi | 361/305 |
| 2007/0121275 A1* | 5/2007 | Takashima et al. | 361/311 |
| 2007/0268651 A1* | 11/2007 | Takashima et al. | 361/303 |
| 2007/0279836 A1* | 12/2007 | Takashima et al. | 361/306.3 |
| 2007/0297153 A1* | 12/2007 | Togashi et al. | 361/760 |
| 2008/0013248 A1* | 1/2008 | Togashi | 361/303 |
| 2008/0013250 A1* | 1/2008 | Aoki | 361/306.3 |
| 2008/0019076 A1* | 1/2008 | Togashi | 361/303 |
| 2008/0204969 A1* | 8/2008 | Takashima et al. | 361/301.4 |

FOREIGN PATENT DOCUMENTS

KR  10-2006-0073274  6/2006

* cited by examiner

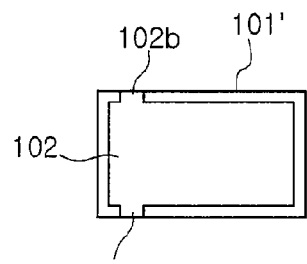
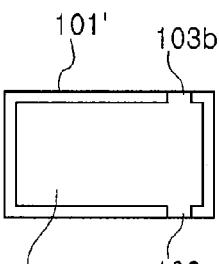
FIG. 11A  FIG. 11B
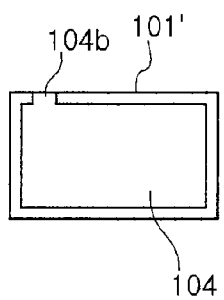
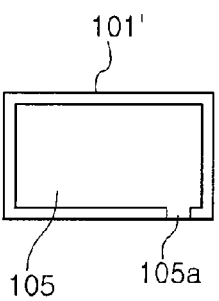
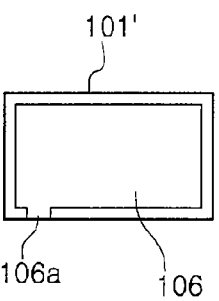
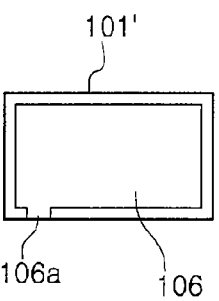
FIG. 11C  FIG. 11D  FIG. 11E  FIG. 11F
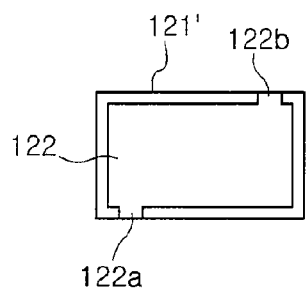
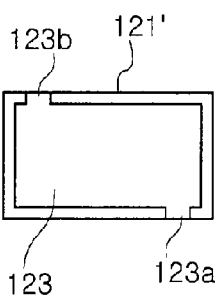
FIG. 12A  FIG. 12B
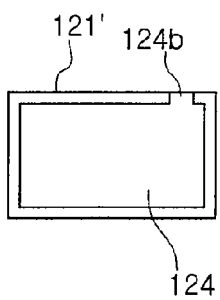
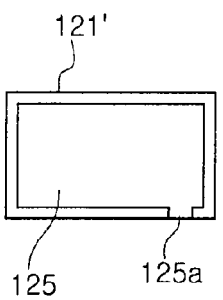
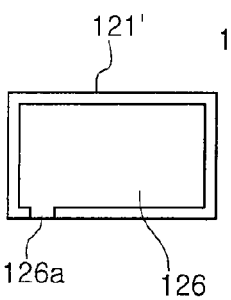
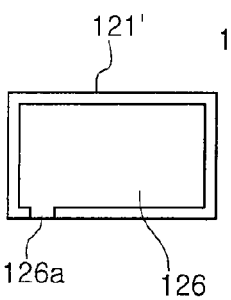
FIG. 12C  FIG. 12D  FIG. 12E  FIG. 12F

MULTILAYER CAPACITOR

CROSS-REFERENCE TO RELATED APPLICATIONS

This application claims the priority of Korean Patent Application No. 2007-98299 filed on Sep. 28, 2007, in the Korean Intellectual Property Office, the disclosure of which is incorporated herein by reference.

BACKGROUND OF THE INVENTION

1. Field of the Invention

The present invention relates to a multilayer capacitor, and more particularly, to a decoupling multilayer capacitor having low equivalent series inductance (ESL) and adjustable equivalent series resistance (ESR).

2. Description of the Related Art

In general, a multilayer chip capacitor (MLCC) has a structure such that inner electrodes of different polarities are laminated alternately while interposing a corresponding one of a plurality of dielectric layers. This multilayer chip capacitor can be miniaturized, performing with high capacity and mounted easily, and thus broadly used as parts of various electronic devices.

Notably, a power supply for a central processing unit (CPU) in a computer experiences voltage noise due to rapid change in a load current when supplying a low voltage. Accordingly, the multilayer chip capacitor is widely utilized in the power supply as a decoupling capacitor for suppressing such voltage noise.

The decoupling multilayer chip capacitor is required to have a lower ESL value with an increase in an operating frequency, and studies for reducing ESL have been vigorously conducted.

Also, in order to supply the power more stably, the decoupling multilayer capacitor should have adjustable ESR characteristics. The multilayer capacitor having ESR lower than a required level increases an impedance peak at a parallel resonant frequency due to the ESL of the capacitor and the plane capacitance of a micro-processor package while extremely lowering impedance at a serial resonant frequency.

Therefore, the decoupling multilayer capacitor may be configured to easily adjust ESR characteristics thereof so that a user can achieve flat impedance characteristics of a power distribution network.

As a method for adjusting ESR, a material with high electrical resistance may be utilized as outer and inner electrodes. Such a change in material advantageously ensures high ESR characteristics, while enabling ESL to be maintained at a low level as in the prior art.

However, the high resistant material, when used for outer electrodes, results in a localized heat spot due to current concentration caused by pin holes. Moreover, the high resistant material, when utilized for inner electrodes, needs to keep changing to match with a ceramic material, which is employed to allow for higher capacity.

As another method for improving ESR, U.S. Pat. No. 6,765,781, whose assignee is TDK, discloses a method of connecting inner electrodes in series to each other through a linkage electrode by disposing the linkage electrode outside the capacitor body.

The inner electrodes connected in series to each other can enhance ESR effectively but lengthens a current path, thereby disadvantageously increasing ESL. As described above, in the conventional method for improving a capacitor structure, a decrease in ESL necessitates a decrease in ESR, and contrarily, an increase in ESR necessitates an increase in ESL. Therefore, it has been hard to adjust ESR to a high level while maintaining ESL at a low level.

SUMMARY OF THE INVENTION

An aspect of the present invention provides a multilayer capacitor of a novel structure capable of adjusting equivalent series resistance (ESR) to a high level, while satisfying low equivalent series inductance (ESL) characteristics without changing a material.

According to an aspect of the present invention, there is provided a multilayer capacitor including: a capacitor body where a plurality of dielectric layers are laminated, the capacitor body including first and second surfaces opposing each other in a laminated direction, wherein the first surface provides a mounting surface; a plurality of first and second inner electrodes arranged alternately to have different polarities opposing each other, while interposing a corresponding one of the dielectric layers, respectively; an inner connecting conductor having at least one polarity disposed adjacent to a corresponding one of the inner electrodes having different polarity, while interposing a corresponding one of the dielectric layers; and a plurality of first and second outer electrodes formed on an outer surface of the body, wherein a corresponding one of the outer electrodes having identical polarity to the inner connecting conductor includes at least one outer terminal formed on the first surface of the body to connect to the inner connecting conductor, and at least one outer connecting conductor formed on the second surface of the body to connect a corresponding one of the inner electrodes of identical polarity to the inner connecting conductor.

In this structure, a current path formed in each capacitor is shortened to achieve low ESL conditions. Also, the number of inner connecting conductors is changed to adjust ESR to a desired higher level. Of course, an inner connecting conductor of any of first and second polarities may be employed to adjust ESR. But inner connecting conductors of both polarities may be employed.

That is, the inner connecting conductor of the at least one polarity includes at least one first and second inner connecting conductors, the plurality of first and second outer electrodes include at least one first and second outer terminals formed on the first surface of the body to connect to the first and second inner connecting conductors, respectively, and at least one first and second outer connecting conductors formed on the second surface of the body to connect the first and second inner electrodes to the first and second inner connecting conductors, respectively.

Similarly to a four terminal structure, the first and second outer terminals and the first and second outer connecting conductors may be provided in a pair, respectively.

The first and second outer electrodes and the first and second outer connecting conductors may be arranged such that corresponding ones of the outer terminals and outer connecting conductors having identical polarity are disposed on the first and second surfaces, respectively to oppose each other. Alternatively, the first and second outer terminals and the first and second outer connecting conductors may be arranged such that corresponding ones of the outer terminals and outer connecting conductors having different polarities are disposed on the first and second surfaces, respectively to oppose each other. In the latter, a current path formed between the first and second outer terminals is opposite to a current path formed between the first and second outer connecting conductors so that ESL can be reduced due to a decrease in magnetic flux.

A total number of the first and second outer terminals may be identical to a total number of the first and second outer connecting conductors, and the total number may be at least three, respectively.

Here, to ensure lower ESL, the first and second outer terminals and the first and second outer connecting conductors are arranged such that corresponding ones of the outer terminals and outer connecting conductors having different polarities adjoin each other on a corresponding one of the surfaces.

The first and second outer terminals and the first and second outer connecting conductors may be arranged such that corresponding ones of the outer terminals and outer connecting conductors having identical polarity are disposed on the first and second surfaces, respectively to oppose each other.

The first and second outer terminals and the first and second outer connecting conductors may be arranged such that corresponding ones of the outer terminals and outer connecting conductors having different polarities are disposed on the first and second surfaces, respectively to oppose each other.

A total number of the first and second outer terminals may be different from a total number of the first and second outer connecting conductors.

To ensure capacitance in a similar manner to other inner electrodes, the first and second inner connecting conductors may have an overlapping area corresponding to an overlapping area between the first and second inner electrodes.

The capacitor body may have a thickness smaller than a length and a width thereof, respectively. The capacitor body may have a length greater than a width thereof, and the capacitor body may have the plurality of dielectric layers laminated in a width direction thereof. Alternatively, the capacitor body may have the plurality of dielectric layers laminated in a length direction thereof.

The first and second outer electrodes each may be extended to a portion of a side surface of the capacitor body so as to be electrically insulated from each other.

According to another aspect of the present invention, there is provided a multilayer capacitor including: a capacitor body where a plurality of dielectric layers are laminated, the capacitor body including first and second surfaces opposing each other in a laminated direction, wherein one of the first and second surfaces provides a mounting surface; a plurality of first and second inner electrodes arranged alternately to have different polarities opposing each other, while interposing a corresponding one of the dielectric layers, respectively; an inner connecting conductor having at least one polarity disposed adjacent to a corresponding one of the inner electrodes having different polarity, while interposing a corresponding one of the dielectric layers; and a plurality of first and second outer electrodes formed on an outer surface of the body, wherein the plurality of first and second outer electrodes are formed such that at least respective ones of the first and second outer electrodes are disposed on the first and second surfaces of the body, respectively, a corresponding one of the inner electrodes having identical polarity to the inner connecting conductor includes first and second groups each including at least one inner electrode, wherein the inner electrode belonging to the first group is connected to a corresponding one of the outer electrodes of identical polarity formed on the first surface, and the inner electrode belonging to the second group is connected to a corresponding one of the outer electrodes of identical polarity formed on the second surface.

The inner connecting conductor of the at least one polarity includes at least one first and second inner connecting conductors, the plurality of first and second inner electrodes include first and second groups each including at least respective ones of the first and second inner electrodes, wherein the first and second inner electrodes belonging to the first group are connected to the first and second outer electrodes formed on the first surface, respectively and the first and second inner electrodes belonging to the second group are connected to the first and second outer electrodes formed on the second surface, respectively.

BRIEF DESCRIPTION OF THE DRAWINGS

The above and other aspects, features and other advantages of the present invention will be more clearly understood from the following detailed description taken in conjunction with the accompanying drawings, in which:

FIGS. 11A to 11F are a plan view illustrating an inner connecting conductor and inner electrodes applicable to the multilayer capacitor according to a fifth embodiment of the invention;

FIGS. 12A to 12F are a plan view illustrating an inner connecting conductor and inner electrodes applicable to a multilayer capacitor according to a sixth embodiment of the invention;

DETAILED DESCRIPTION OF THE PREFERRED EMBODIMENT

Exemplary embodiments of the present invention will now be described in detail with reference to the accompanying drawings.

Figure 1:
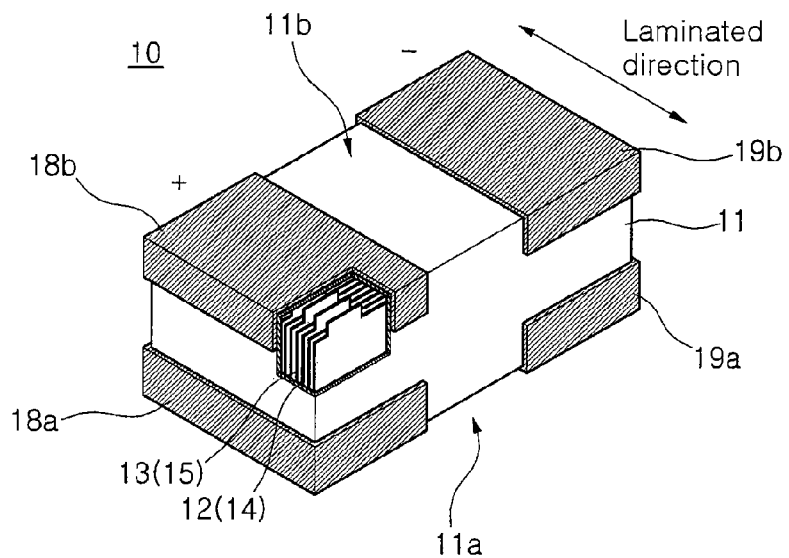
FIG. 1 is a perspective view illustrating a multilayer capacitor according to a first embodiment of the invention.
Figure 2:
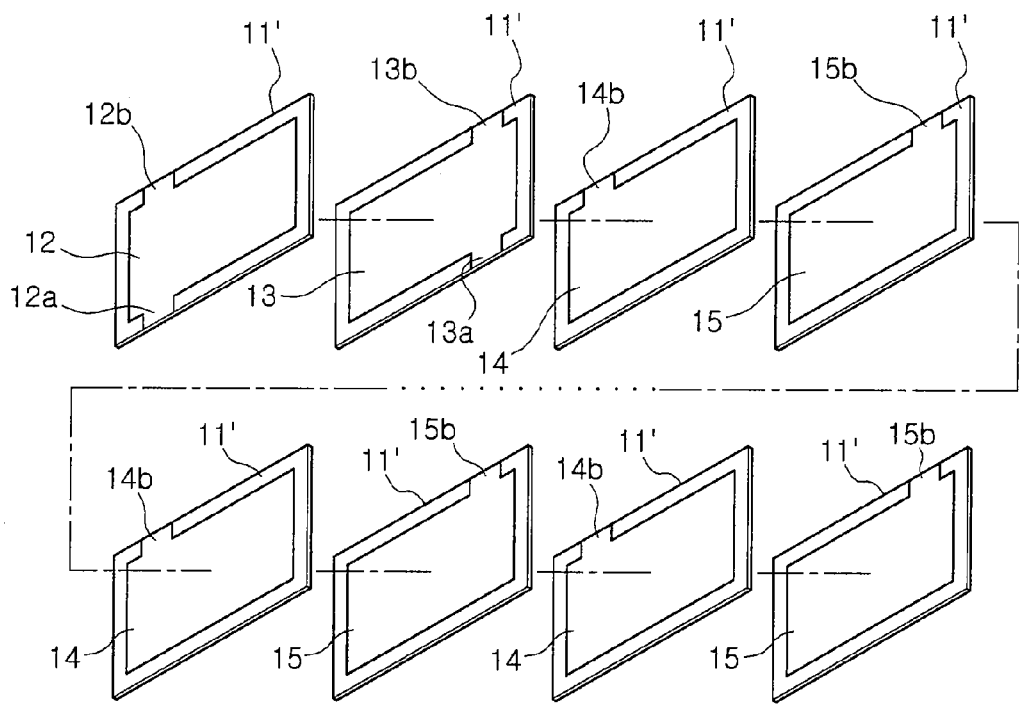
FIG. 2 is an exploded perspective view illustrating the multilayer capacitor shown in FIG. 1.

FIGS. 1 and 2 are an external perspective view and an exploded perspective view illustrating a multilayer capacitor structure according to a first embodiment of the invention, respectively.

Referring to FIG. 1, the multilayer capacitor 10 of the present invention includes a capacitor body 11 having a plurality of dielectric layers laminated therein. The capacitor body 11 has opposing first and second surfaces 11a and 11b formed in a laminated direction of the dielectric layers.

In the multilayer capacitor 10 mounted on a printed circuit board, the first and second surfaces 11a and 11b of the capacitor body 11 provide a bottom surface, i.e., mounting surface and a top surface, respectively. In this mounting position, the multilayer capacitor may have a thickness smaller than a length and width of the body 11 than a conventional multilayer chip capacitor (MLCC).

In the present embodiment, the multilayer capacitor 10 has respective two first and second outer electrodes 18a and 18b; 19a and 19b which are electrically insulated from each other. The outer electrodes 18a, 18b, 19a, and 19b are formed on the first and second surfaces but may be extended along a side surface adjacent thereto in order to ensure the multilayer capacitor to be easily mounted. Also, as shown in FIG. 2, the multilayer capacitor 10 includes first and second inner connecting conductors 12 and 13 and a plurality of first and second inner electrodes 14 and 15, and a corresponding one of the inner connecting conductors 12 and 13 and the inner electrodes 14 and 15 is formed on each of the dielectric layers 11'.

The plurality of first and inner electrodes 14 and 15 and the first and second inner connecting conductors 12 and 13 are arranged such that corresponding ones of the inner electrodes 14 and 15 and the inner connecting conductors 12 and 13 having different polarities alternate with each other.

The first inner connecting conductor 12 is connected to the first outer electrodes 18a and 18b formed on the first and second surfaces 11a and 11b through two leads 12a and 12b, respectively. In a similar manner, the second inner connecting conductor 13 is connected to the second outer electrodes 19a and 19b formed on the first and second surfaces 11a and 11b through two leads 13a and 13b, respectively.

The first and second outer electrodes 18a and 19b formed on the first surface 11a, i.e., mounting surface are directly connected to power lines of a board (not shown). Hereinafter, the first and second outer electrodes 18a and 19b are referred to as "first and second outer terminals". In contrast, the other first and second outer electrodes 18b and 19b formed on the second surface 11b of the body 11 are not directly connected to the power lines, but connect a corresponding one of the first and second inner connecting conductors to a corresponding one of the first and second inner electrodes 14 and 15 to have identical polarity to each other. Hereinafter, the first and second outer electrodes 18b and 19b are referred to as "first and second outer connecting conductors".

The first and second inner connecting conductors 12 and 13 are connected to the first and second outer terminals 18a and 19a through the leads 12a and 13a extended to the first surface 11a, respectively. Also, the first and second inner connecting conductors 12 and 13 are connected to the first and second outer connecting conductors 18b and 19b through the leads 12a and 13b extended to the second surface 11b.

Meanwhile, the first and second inner electrodes 14 and 15 are not directly connected to the first and second outer terminals 18a and 19a, but connected to the first and second outer connecting conductors 18b and 19b through the leads 14b and 15b extended to the second surface 11b.

In this connections structure, the first and second inner connecting conductors 12 and 13 can be connected in series with the first and second inner electrodes 14 and 15, respectively through the first and second outer connecting conductors 18b and 19b. Therefore, the first and second inner connecting conductors 12 and 13 connected in this fashion can serve to increase ESR. Furthermore, the first and second inner connecting conductors 12 and 13 may be employed in an appropriate number to attain a desired high level of ESR even though the first and second inner electrodes 14 and 15 are laminated in a greater number.

In the present embodiment, the first and second inner connecting conductors 12 and 13 are directly connected to the first and second outer terminals 18a and 19a and connected to the first and second inner electrodes 14 and 15 which are not directly connected to the first and second outer electrodes 18a and 19b, through the first and second outer connecting conductors 18b and 19b in order to satisfy ESR characteristics.

However, as shown in FIG. 2, to ensure sufficient capacitance, the first and second inner connecting conductors 12 and 13 each may be formed to have an overlapping area with a corresponding one of the adjacent inner electrodes or inner connecting conductors having different polarity, in a similar manner as the other inner electrodes have an overlapping area.

As described above, in the capacitor structured according to the present embodiment, the number of the first and second inner connecting conductors may be varied to assure a desired high level of ESR. Moreover, the current path can be shortened to achieve low ESL characteristics.

Figure 3:
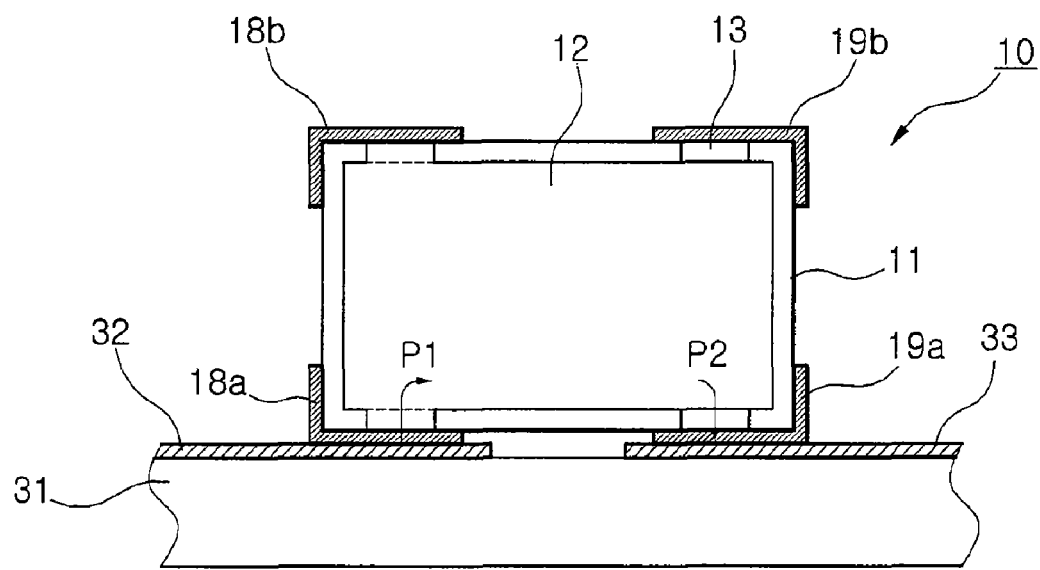
FIG. 3 is a cross-sectional view illustrating the multilayer capacitor of FIG. 1 mounted on a printed circuit board.

Referring to FIG. 3, the multilayer capacitor 10 shown in FIGS. 1 and 2 is mounted on a printed circuit board 31. As shown in FIG. 3, the first and second inner connecting conductors 12 and 13 are disposed perpendicular to a top surface of the board. In this structure, a current path (P1→P2) in the capacitor at a high frequency can be formed through bottom surfaces of the inner connecting conductors.

Figure 4:
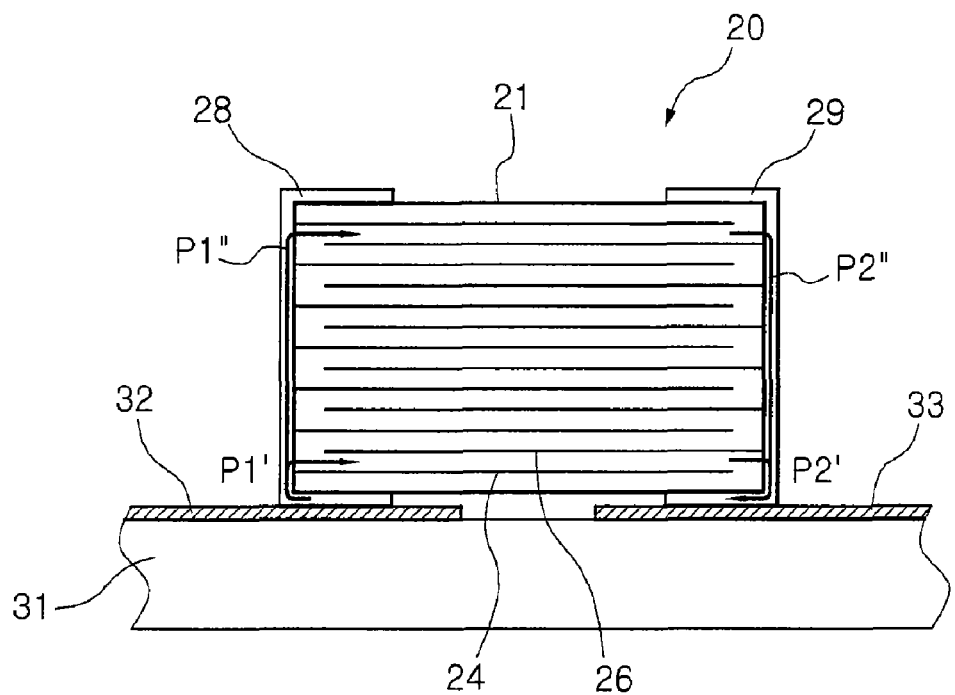
FIG. 4 is a cross-sectional view illustrating a conventional multilayer capacitor mounted on a printed circuit board.

In contrast, as shown in FIG. 4, a conventional capacitor 20 includes a capacitor body 21, first and second inner electrodes 24 and 26 laminated alternately in a laminated direction and first and second outer electrodes 28 and 29 formed on both side surfaces of the capacitor body 21. In this capacitor 20, a current path at a high frequency is defined by a current path (P1'→P2') formed in a lower layer having low impedance rather than a current path (P1"→P2") formed in an upper layer having relatively greater impedance. The capacitor structure shown in FIG. 3 exhibits a current path relatively shorter than the current path of the capacitor structure shown in FIG. 4. This allows the capacitor structure shown in FIG. 3 to have a relatively low inductance.

Also, in the capacitor structure of FIG. 3, an increase in the number of the first and second inner connecting conductors also leads to an increase in the number of current paths formed on bottom surfaces of the inner connecting conductors. This can further reduce ESL of the capacitor. On the other hand, in a capacitor structure of FIG. 4, an increase in the first and second inner connecting conductors does not affect the current path (P1'→P2') formed in a lowermost layer of the capacitor, accordingly not affecting the ESL either. Therefore, the structure of FIG. 3 is construed to yield much lower ESL than the structure of FIG. 4 when the inner connecting conductors are increased in number.

As described above, the structure of the present embodiment ensures lower ESL than the conventional multilayer capacitor structure. Moreover, the inner electrodes are not directly connected to the outer terminals, but connected to the outer connecting conductors and the inner connecting conductors to be connected in series to the outer terminals, thereby allowing ESR to be adjusted to a higher level.

In the present embodiment, the outer electrodes can be arranged in a different configuration to bring in an additional reduction in ESL.

Figure 5:
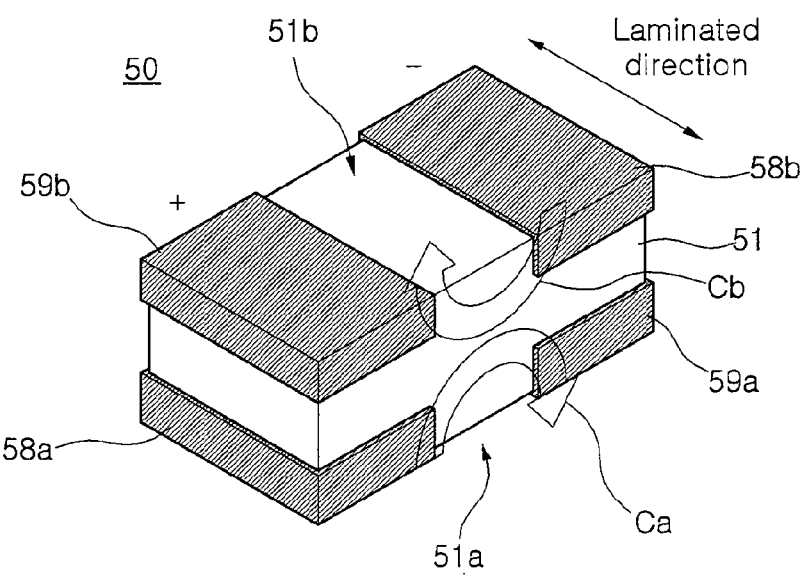
FIG. 5 is a perspective view illustrating a multilayer capacitor according to a second embodiment of the invention.
Figures 6A, 6B, 6C, 6D:
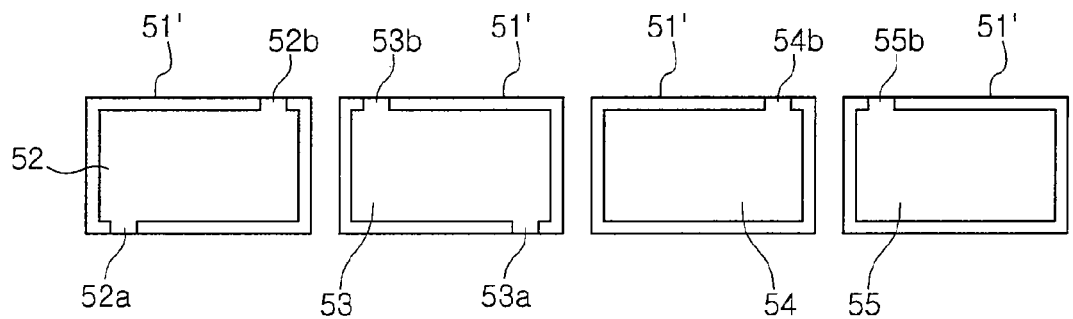
FIGS. 6A to 6D are a plan view illustrating an inner connecting conductor and inner electrodes applicable to the multilayer capacitor shown in FIG. 5.

FIG. 5 is a perspective view illustrating a multilayer capacitor according to a second embodiment of the invention. FIG. 6 is a plan view illustrating an inner connecting conductor and inner electrodes applicable to the multilayer capacitor shown in FIG. 5.

Referring to FIG. 5 along with FIG. 6, a multilayer capacitor 50 of the present embodiment includes a capacitor body 51 having a plurality of dielectric layers 51' laminated therein. Similarly to FIG. 1, the capacitor body 51 includes opposing first and second surfaces 51a and 51b formed in a laminated direction and the first surface 51a provides a mounting surface.

As shown in FIG. 6, the multilayer capacitor 50 includes first and second inner connecting conductors 52 and 53 and a plurality of first and second inner electrodes 54 and 55 formed on the dielectric layers 51', and a corresponding one of the inner connecting conductors 52 and 53 and inner electrodes 54 and 55 is formed on each of the dielectric layers 51'. The plurality of first and second inner electrodes 54 and 55 and the first and second inner connecting conductors 52 and 53 are arranged such that corresponding ones of the inner electrodes 54 and 55 and inner connecting conductors 52 and 53 having different polarities alternate with each other.

Referring to FIG. 6, the inner connecting conductors 52 and 53 and the inner electrodes 54 and 55 are formed in one pair but may be formed in a plurality of pairs. As in the previous embodiment, the inner connecting conductors 52 and 53 may be varied in number to adjust ESR. Furthermore, the inner connecting conductors 52 and 53 and the inner electrode 54 and 55 may be laminated in various orders as long as having different polarities alternating with each other. For example, the inner connecting conductors 52 and 53 may be disposed between the inner electrodes, as exemplified by C-D-A-B-C-D . . . C-D. The first and second inner connecting conductors 52 and 53 may be spaced apart from each other, as exemplified by A-D-C-D-B-C-D . . . C-D.

Similarly to the previous embodiment, the capacitor body 51 includes the first and second outer terminals 58a and 59a formed on the first surface 51a thereof to connect to external power lines. The capacitor body 51 includes the first and second outer connecting conductors 58b and 59b formed on the second surface 51b thereof. However, unlike the previous embodiment, the first and second outer terminals 58a and 59b and the first and second outer connecting conductors 59b and 58b are arranged at opposite positions to have different polarities from each other, respectively.

In this arrangement, the first inner connecting conductor has leads 52a and 52b arranged diagonally to connect the first outer terminal 58a to the first outer connecting conductor 58b. In a similar manner, the second inner connecting conductor 53 has leads 53a and 53b arranged reverse-diagonally to connect the second outer terminal 59a to the second outer connecting conductor 59b.

The first and second inner electrodes 54 and 55 are not directly connected to the first and second outer terminals 58a and 59a. However, the first and second inner electrodes 54 and 55 are only connected to the first and second outer connecting conductors 58b and 59b through leads 54b and 55b extended to the second surface 51b, respectively.

Therefore, similarly to the previous embodiment, the first and second inner connecting conductors 52 and 53 connected in this fashion can serve to increase ESR. Also, as schematically indicated with arrows in FIG. 5, a current path formed between the first and second outer terminals 58a and 59a and a current path formed between the first and second outer connecting conductors 58b and 59b are opposite to each other, thereby canceling out magnetic flux.

As described above, in the present embodiment, the outer electrodes are arranged such that the magnetic flux is cancelled out. This arrangement ensures bigger ESL reduction than the previous embodiment in which corresponding ones of the outer terminals and outer connecting conductors having identical polarity are disposed on the first and second surfaces, respectively to oppose each other.

The above embodiments illustrate a four terminal multilayer capacitor. However, the present invention can be configured in a six or more terminal structure.

Figure 7:
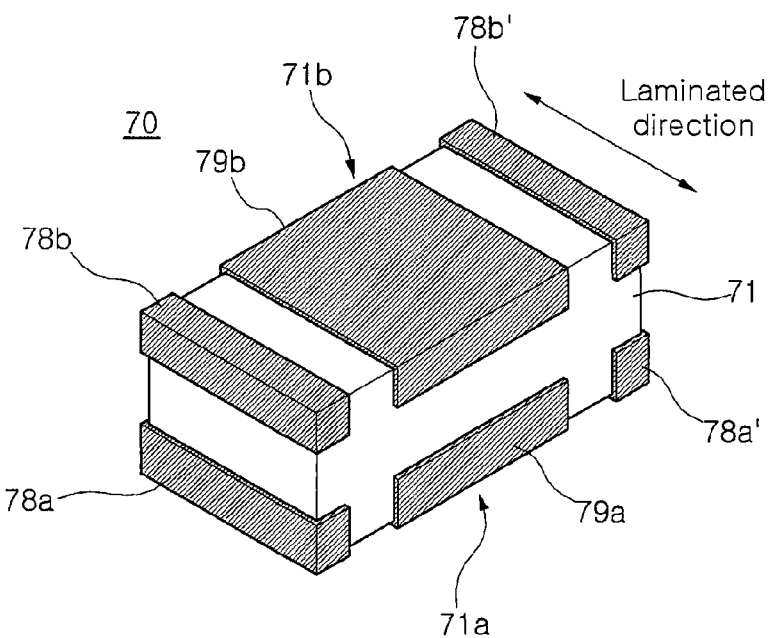
FIG. 7 is a perspective view illustrating a multilayer capacitor according to a third embodiment of the invention.
Figure 9:
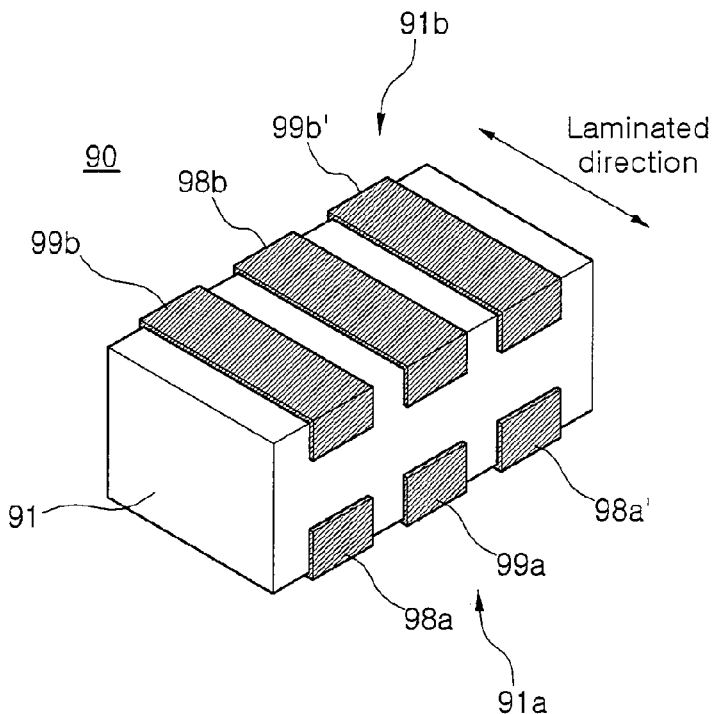
FIG. 9 is a perspective view illustrating a multilayer capacitor according to a fourth embodiment of the invention.

FIGS. 7 and 9 illustrate a six terminal multilayer capacitor according to another exemplary embodiment of the invention according to a third and fourth embodiment of the invention, respectively.

Referring to FIG. 7, the multilayer capacitor 70 of the present embodiment includes a capacitor body 71 having a plurality of dielectric layers 71' laminated therein. The capacitor body 71 includes opposing first and second surfaces 71a and 71b formed in a laminated direction, and the first surface 71a provides a mounting surface.

Figures 8A, 8B, 8C, 8D:
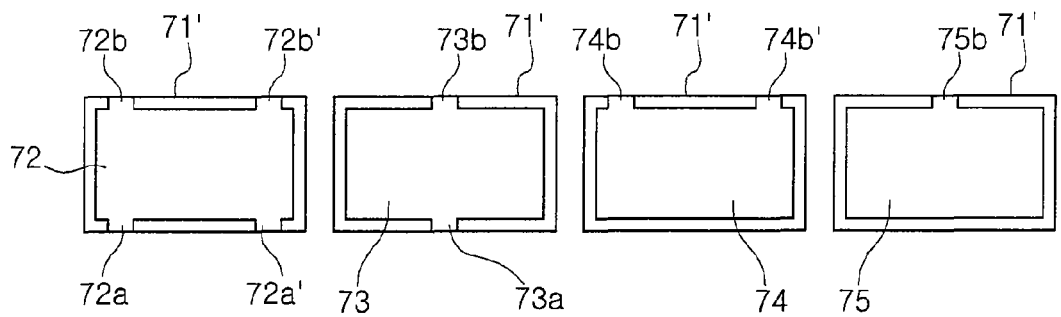
FIGS. 8A to 8D are a plan view illustrating an inner connecting conductor and inner electrodes applicable to the multilayer capacitor shown in FIG. 7.

As shown in FIG. 8, the multilayer capacitor 70 includes at least one first and second inner connecting conductors 72 and 73 and a plurality of first and second inner electrodes 74 and 75 formed on the dielectric layers 71', respectively. The plurality of first and second inner electrodes 74 and 75 and the first and second inner connecting conductors 72 and 73 are arranged such that corresponding ones of the inner electrodes 74 and 75 and the inner connecting conductors 72 and 73 having different polarities alternate with each other. Referring to FIG. 8, the inner connecting conductors 72 and 73 and the inner electrodes 74 and 75 are formed in one pair, respectively but may be formed in a plurality of pairs and in various orders.

The multilayer capacitor 70 of the present embodiment is formed of a six terminal structure including four first outer electrodes 78a, 78b, 78a', and 78b' and two second outer electrodes 79a and 79b. The outer electrodes formed on the first surface 71a includes the two first outer terminals 78a and 78a' connected to external power lines and one second outer terminal 79a. Also, the outer electrodes formed on the second surface 71b includes the two first outer connecting conductors 78b and 78b' and the first outer connecting conductor 79b.

The first inner connecting conductor 72 is connected to the two first outer terminals 78a and 78a' and the two first outer connecting conductors 78b and 78b' through leads 72a, 72a', 72b, and 72b', respectively. The second inner connecting conductor 73 is connected to the second outer terminal 79a and the second outer connecting conductor 79b through leads 73a and 73b, respectively. In this connection, the first and second outer terminals 78a, 78a' and 79a are formed at opposite positions to the first and second outer connecting conductors 78b, 78b' and 79b to have identical polarity to each other, in a symmetrical configuration with respect to a central axis.

Moreover, the first and second inner electrodes 74 and 75 are not directly connected to the first and second outer terminals 78a, 78a' and 79a. The first inner electrode 74 is connected to the first outer connecting conductors 78b and 78b' through leads 74b and 74b' extended to the second surface 71b, respectively. The second inner electrode 75 can be only connected to the second outer connecting conductor 79b through a lead 75b.

In this connection, the first and second inner connecting conductors 72 and 73 are connected in series with the first and second inner electrodes 74 and 75, respectively, through the first and second outer connecting conductors 78b, 78b', and 79b. The first and second inner connecting conductors 72 and 73 connected in this fashion allow for an increase in ESR. Accordingly, the first and second inner connecting conductors 72 and 73 may be varied in number to easily achieve desired high ESR despite an increase in the number of laminations.

The multilayer capacitor of FIG. 9 is similar to the capacitor shown in FIG. 7 in the arrangement of outer electrodes. But in this six terminal structure, three first outer electrodes 98a, 98b, and 98a' are formed on a first surface 91a to oppose three second outer electrodes 99a, 99b, and 99a' to have different polarities from each other.

Referring to FIG. 9, the multilayer capacitor 90 of the present embodiment includes a capacitor body 91 having a plurality of dielectric layers 91' laminated therein. The capacitor body 91 includes opposing first and second surfaces 91a and 91b formed in a laminated direction, and the first surface 91a provides a mounting surface.

Figures 10A, 10B, 10C, 10D:
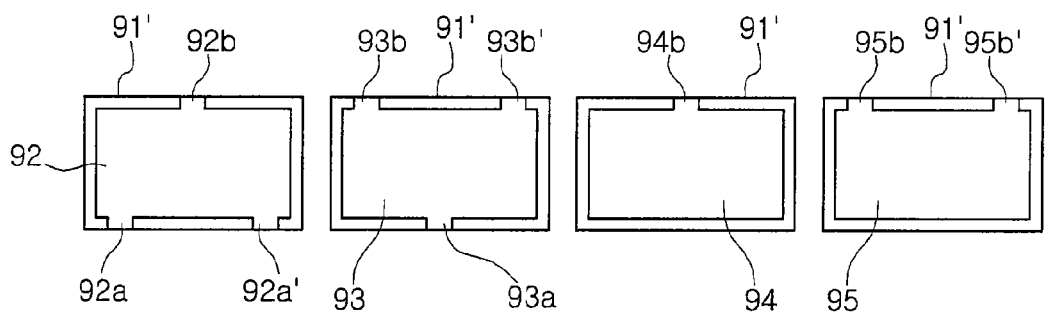
FIGS. 10A to 10D are a plan view illustrating an inner connecting conductor and inner electrodes applicable to the multilayer capacitor shown in FIG. 9.

As shown in FIG. 10, the multilayer capacitor 90 includes at least one first and second inner connecting conductors 92 and 93 and a plurality of first and second inner electrodes 94 and 95 formed on a corresponding one of the dielectric layers 91', respectively. The plurality of first and second inner electrodes 94 and 95 and the first and second inner connecting conductors 92 and 93 are arranged such that corresponding ones of the inner electrodes 94 and 95 and inner connecting conductors 92 and 93 having different polarities alternate with each other. Referring to FIG. 10, the inner connecting conductors 92 and 93 and the inner electrodes 94 and 95 are formed in one pair, respectively, but may be formed in a plurality of pairs and in various orders.

The multilayer capacitor 90 of the present embodiment is formed of a six terminal structure including three first outer electrodes 98a, 98a', and 98b and three second outer electrodes 99a, 99a' and 99b. Among these first and second outer electrodes, the outer electrodes formed on the first surface 91a include the two first outer terminals 98a and 98a' connected to external power lines and the second outer terminal 99a. Also, the outer electrodes formed on the second surface 91b include the first outer connecting conductor 98b and the two second outer connecting conductors 99b and 99b'.

The first inner connecting conductor 92 is connected to the two first outer terminals 98a and 98a' and the first outer connecting conductor 98b through leads 92a, 92a', and 92b, respectively. The second inner connecting conductor 93 is connected to the second outer terminal 99a and the two second outer connecting conductors 99b and 99b' through leads 93a, 93b, and 93b', respectively. In this connection, the first and second outer terminals 98a, 98a', and 99a may be arranged at opposite positions to the first and second outer connecting conductors 8b, 98b' and 99b to have different polarities from each other.

Particularly, in a similar manner to FIG. 5, a current path of the first and second outer terminals 98a, 98a' and 99a is opposite to a current path of the first and second outer connecting conductors 98b, 99b, and 99b', thereby canceling out magnetic flux. This ensures a further reduction in ESL than the embodiment shown in FIG. 7.

Moreover, the first and second inner electrodes 94 and 95 are not directly connected to the first and second outer terminals 98a, 98a', and 99a. The first inner electrode 94 is connected to the first outer connecting conductor 98b through a lead 94b extended to the second surface 91b. The second inner electrode 95 is connected to the second outer connecting conductors 99b and 99b' through leads 95b and 95b', respectively.

In this connection, the first and second inner connecting conductors 92 and 93 are connected in series with the first and second inner electrodes 94 and 95, respectively, through the first and second outer connecting conductors 98b, 99b, and 99b'. The first and second inner connecting conductors 92 and 93 connected in this fashion allow for an increase in ESR. Accordingly, the first and second inner connecting conductors 92 and 93 may be varied in number to easily achieve desired high ESR despite an increase in the number of laminations.

FIG. 10 illustrates the multilayer capacitor according to an exemplary embodiment of the invention, in which a specific mounting surface is selected. In this case, a predetermined mark may be added to the mounting surface or a surface opposing the mounting surface, i.e., second surface to distinguish the mounting surface.

Unlike the aforesaid embodiments, another aspect of the invention provides a multilayer capacitor in which one of the first and second surfaces can be selected as a mounting surface to have low ESL characteristics and adjustable ESR characteristics. The multilayer capacitor with this aim has outer electrodes similar to those of the above embodiments, but has inner electrodes divided into two groups according to the connection configuration thereof.

The multilayer capacitor according to the another aspect of the present embodiment has outer electrodes arranged in a similar manner to the previous embodiment. Thus, the previous embodiment may be applied when it comes to the arrangement of the outer electrodes. However, in the embodiment below, it should be noted that according to selection of the mounting surface, the outer electrode formed on the second surface of the body may be employed as an outer terminal and the outer electrode formed on the first surface of the body may be employed as an outer connecting conductor.

Hereinafter, the multilayer capacitor according to the another aspect of the invention will be described based on the inner connecting conductors and inner electrodes.

FIG. 11 is a plan view illustrating inner connecting conductors and inner electrodes applicable to the multilayer capacitor according to a fifth embodiment of the invention. The present embodiment can be applied to a structure similar to the arrangement of the outer electrodes shown in FIG. 1.

As shown in FIG. 11, in a similar manner to the inner connecting conductors shown in FIG. 2, a first inner connecting conductor 102 is connected to first outer electrodes formed on the first and second surfaces through leads 102a and 102b, respectively. The second inner connecting conductor 103 is connected to second outer electrodes formed on the first and second surfaces through leads 103a and 103b, respectively.

Meanwhile, the first and second inner electrodes 104, 105, 106, and 107 are divided into two groups according to the configuration of connection with the outer electrodes, i.e., location of the leads. Each of the groups is connected to the outer electrodes formed on the opposing surfaces.

More specifically, similarly to the inner electrodes shown in FIG. 2, the first and second inner electrodes 104 and 107 belonging to the first group (C) and (F) are connected to the first and second outer electrodes formed on the second surface through leads 104b and 107b extended to the second surface. Also, the first and second inner electrodes 106 and 105 belonging to the second group (D) and (E) are connected to the first and second outer electrodes formed on the first surface through leads 106a and 105a extended to the first surface.

In this connection, when the first surface provides a mounting surface, the first and second inner electrodes 104 and 107 belonging to the first group are connected in series with the first and second inner connecting conductors 102 and 103 through an outer electrode formed on the second surface, which acts as an outer connecting conductor described above. Accordingly, this allows for an increase in ESR.

In contrast, in a case where the second surface provides a mounting surface, the first and second electrodes 106 and 105 belonging to the second group are connected in series with the first and second inner connecting conductors 102 and 103 through the outer electrode formed on the first surface, which acts as an outer connecting conductor described above. Accordingly, this allows for an increase in ESR.

In this fashion, one of the first and second surfaces selectively provides a mounting surface according to the user's need. Moreover, this brings in an increase in ESR.

Whichever of the first and second surfaces is selected as a mounting surface to connect the outer electrodes at specific opposing positions, the capacitor is structured to have identical ESR and ESL.

To this end, in the present embodiment, the first and second inner electrodes 104, 105, 106, and 107 and the first and second inner connecting conductors 102 and 103 may be connected to each other such that a connection configuration of the first and second outer electrodes formed on the first surface is horizontally symmetrical with a connection configuration of the first and second electrodes formed on the second surface.

Moreover, in the present embodiment, the number and arrangement order of the A-E layers may be selected arbitrarily as long as identical ESR and ESL conditions are assured despite a change in the mounting surface. For example, equal numbers of inner electrodes belonging to the first and second groups, respectively may be employed to be selectively and directly connected to a terminal. Also, the inner electrodes belonging to the first and second groups may be arranged in a predetermined order, as exemplified by A-B-C-D-E-F . . . C-D-E-F.

FIG. 12 is a plan view illustrating inner connecting conductors and inner electrodes applicable to a multilayer capacitor according to a sixth embodiment of the invention. The present embodiment can be applied to a structure similar to the arrangement of the outer electrodes shown in FIG. 5.

As shown in FIG. 12, in a similar manner to the inner connecting conductors shown in FIG. 6, a first inner connecting conductor 121 is connected to first outer electrodes formed on the first and second surfaces through lead 122a and 122b, respectively. The second inner connecting conductor 123 may be connected to second outer electrodes formed on the first and second surfaces through leads 123a and 123b, respectively.

Meanwhile, first and second inner electrodes 124 and 126; 125 and 127 are divided into two groups so that each of the groups is connected to the outer electrodes formed on the different surfaces, respectively.

More specifically, in the same manner as the inner electrodes shown in FIG. 6, the first and second inner electrodes 124 and 127 belonging to the first group (C) and (F) are connected to the first and second outer electrodes formed on the second surface through leads 124b and 127b extended to the second surface, respectively. The first and second inner electrodes 126 and 125 belonging to the second group (D) and (E) are connected to first and second outer electrodes formed on the first surface through leads 126a and 125a, respectively.

Similarly to FIG. 5, this connection structure ensures ESR to be increased to a predetermined level and allows one of the first and second surfaces to be arbitrarily selected as a mounting surface according to the user's need. Moreover, whichever of the first and second surfaces provides a mounting surface, currents in upper and lower parts flow in opposite directions to each other, thereby canceling out magnetic flux. This results in an additional decrease in ESL.

Figures 13A, 13B:
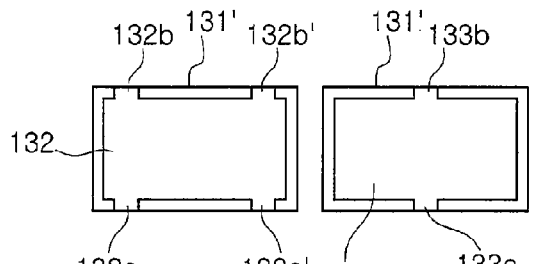
FIGS. 13A to 13F are a plan view illustrating an inner connecting conductor and inner electrodes applicable to a multilayer capacitor according to a seventh embodiment of the invention.
Figures 13C, 13D, 13E, 13F:
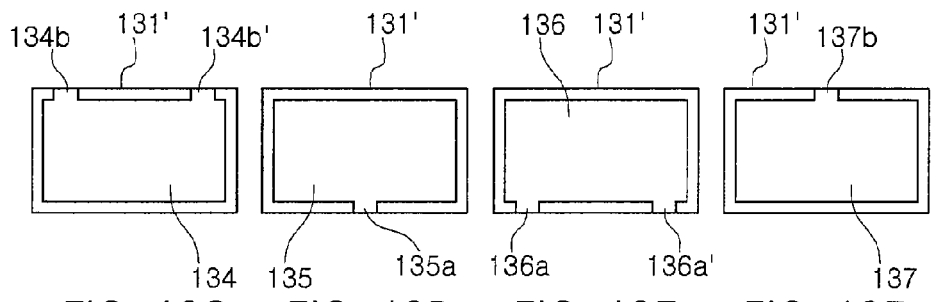

FIG. 13 is a plan view illustrating inner connecting conductors and inner electrodes applicable to a multilayer capacitor according to a seventh embodiment of the invention. This embodiment can be applied to a structure similar to the arrangement of the outer electrodes shown in FIG. 7.

As shown in FIG. 13, similarly to the inner connecting conductors shown in FIG. 8, a first inner connecting conductor 132 is connected to four first outer electrodes formed on the first and second surfaces through four leads 132a, 132b, 132a', and 132b', respectively. A second inner connecting conductor 133 is connected to second outer electrodes formed on the first and second surfaces through leads 133a and 133b, respectively.

First and second inner electrodes 134, 136; 135, 137 are divided into two groups to connect to the outer electrodes formed on the opposing surfaces, respectively. In the same manner as the inner electrodes shown in FIG. 8, the first and second inner electrodes 134 and 137 belonging to the first group (C) and (F) are connected to the first and second outer electrodes formed on the second surface through leads 134b, 134b', and 137b extended to the second surface. Also, the first and second inner electrodes 136 and 135 belonging to the second group (D) and (E) are connected to the first and second outer electrodes formed on the first surface through leads 136a, 136a', and 135a extended to the first surface.

Figures 14A, 14B:
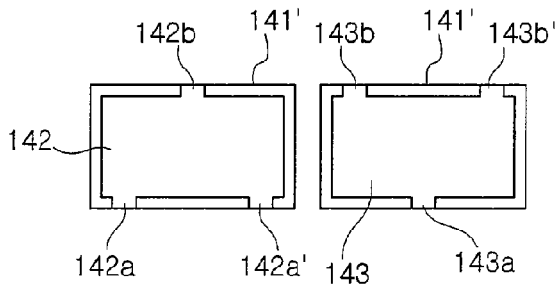
FIGS. 14A to 14F are a plan view illustrating an inner connecting conductor and inner electrodes applicable to a multilayer capacitor according to an eighth embodiment of the invention.
Figures 14C, 14D, 14E, 14F:
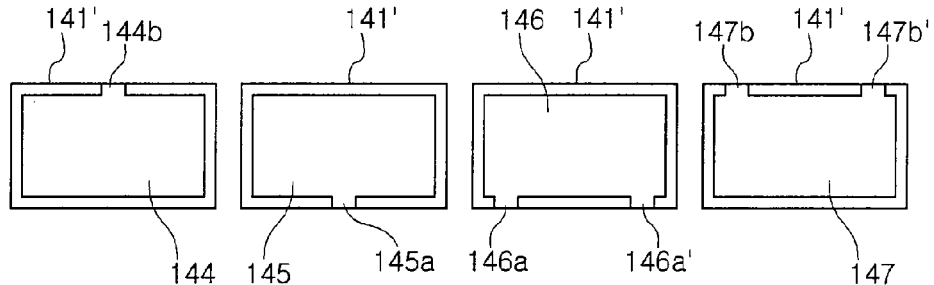

FIG. 14 is an eighth embodiment of the invention, which is applicable to a structure similar to the arrangement of the outer electrodes shown in FIG. 9. First and second inner connecting conductors and some portions of inner electrodes shown in FIG. 14 are construed to be similar to the embodiment shown in FIG. 10. That is, a first inner connecting conductor 142 is connected to three first outer electrodes formed on the first and second surfaces through three leads 142a, 142a', and 142b, respectively. A second inner connecting conductor 143 is connected to second outer electrodes formed on the first and second surfaces through leads 143a, 143b, and 143b', respectively.

First and second inner electrodes 144, 146; 145, 147 are divided into two groups to connect to the outer electrodes formed on the different surfaces, respectively. In the same manner as the inner electrodes shown in FIG. 10, the first and second inner electrodes 144 and 147 belonging to the first group (C) and (F) are connected to the first and second outer electrodes formed on the second surface through the leads 144b, 147b, and 147b' extended to the second surface. Also, the first and second inner electrodes 146 and 145 belonging to the second group (D) and (E) are connected to the first and second outer electrodes formed on the first surface through leads 146a, 145a, and 145a' extended to the first surface.

Figures 15A, 15B, 15C, 15D:
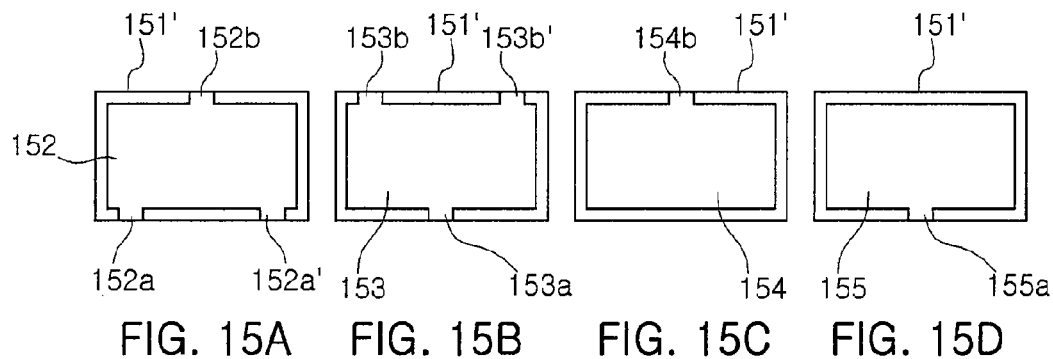
FIGS. 15A to 15D are a plan view illustrating an inner connecting conductor and inner electrodes applicable to a multilayer capacitor according to a ninth embodiment of the invention.

FIG. 15 is a plan view illustrating inner connecting conductors and inner electrodes applicable to a multilayer capacitor according to a ninth embodiment of the invention. This embodiment can be applied to a six terminal multilayer capacitor similar to the arrangement of the outer electrodes shown in FIG. 7 or 9.

As shown in FIG. 15, a first inner connecting conductor 152 is connected to first outer electrodes formed on the first and second surfaces through leads 152*a*, 152*a*', and 152*b*, respectively. A second inner connecting conductor 153 is connected to second outer electrodes formed on the first and second surfaces through leads 153*a*, 153*b*, and 153*b*, respectively.

In the present embodiment, first and second inner electrodes 154 and 155 are configured into different groups. More specifically, as shown in FIG. 15, the first inner electrode 154 is connected to only a predetermined one of the first outer electrodes on the second surface through the lead 154*b* extended to the second surface. Also, the second inner electrode 155 is connected to only a predetermined one of the second outer electrodes on the second surface through the lead 155*a* extended to the first surface.

This connection structure allows one of the first and second surfaces to be arbitrarily selected as a mounting surface according to the user's need, and also ensures better ESR. Moreover, this beneficially simplifies the inner electrode structure.

The present embodiment may be modified variously. In the previous embodiment, the capacitor body whose length is greater than a width thereof includes the plurality of dielectric layers laminated in a width direction. In contrast, in a perspective view of a multilayer capacitor according to a tenth embodiment of the invention shown in FIG. 16, a plurality of dielectric layers are laminated in a length direction.

Figure 16:
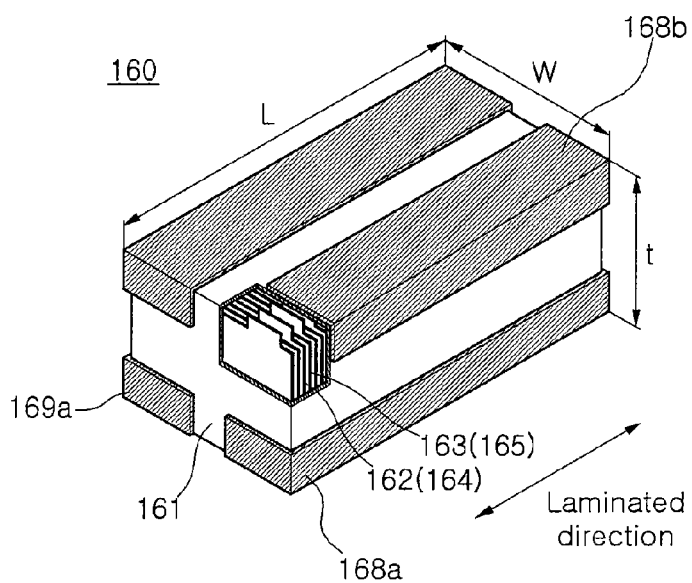
FIG. 16 is a perspective view illustrating a multilayer capacitor according to a tenth embodiment of the invention.

More specifically, as shown in FIG. 16, the multilayer capacitor 160 includes a body 161 where inner connecting conductors 162 and 163 and inner electrodes 164 and 165 are laminated. In the present embodiment, the body 161 has a length L greater than a width W and includes the plurality of dielectric layers, i.e., inner connecting conductors 162 and 163 and inner electrodes 164 and 165 laminated in a length direction. Accordingly, the four outer electrodes 168*a*, 168*b*, 169*a*, and 169*b* are formed in a length direction.

In the present embodiment, an electrode pattern with a relatively smaller width is provided to reduce the size of a current loop, thereby bringing in an additional decrease in ESL.

As set forth above, a multilayer capacitor according to exemplary embodiments of the invention does not involve a change in materials for electrodes to improve a structure of a multilayer capacitor and satisfy low ESL characteristics while capable of adjusting ESR to a desired high level. Also, the multilayer capacitor is structured to satisfy low ESL characteristics and adjustable high ESR characteristics as well. In addition, in the multilayer capacitor, one of surfaces formed in a laminated direction can be selectively employed as a mounting surface to ensure more convenience.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer capacitor comprising:
a capacitor body where a plurality of dielectric layers are laminated, the capacitor body including first and second surfaces opposing each other, wherein the first surface provides a mounting surface;
a plurality of first and second inner electrodes arranged alternately to have different polarities opposing each other, while interposing a corresponding one of the dielectric layers, respectively;
an inner connecting conductor having at least one polarity disposed adjacent to a corresponding one of the inner electrodes having different polarity, while interposing a corresponding one of the dielectric layers; and
a plurality of first and second outer electrodes formed on an outer surface of the capacitor body,
wherein a corresponding one of the outer electrodes having identical polarity to the inner connecting conductor comprises at least one outer terminal formed on the first surface of the capacitor body to connect to the inner connecting conductor, and at least one outer connecting conductor formed on the second surface of the capacitor body to connect a corresponding one of the inner electrodes of identical polarity to the inner connecting conductor,
wherein the first and second surfaces are opposite each other in a direction which the plurality of first and second outer electrodes are connected to at least one of the plurality of first and second inner electrodes and the inner connecting conductor, and the direction is intersected with a laminated direction of the plurality of the first and second inner electrodes and the inner connecting conductor, and
wherein the inner connecting conductor of the at least one polarity comprises at least one first and second inner connecting conductors, the at least one outer terminal comprises at least one first and second outer terminals formed on the first surface of the body to connect to the first and second inner connecting conductors, respectively, and the at least one outer connecting conductor comprises at least one first and second outer connecting conductors formed on the second surface of the body to connect the first and second inner electrodes to the first and second inner connecting conductors, respectively.

2. The multilayer capacitor of claim 1, wherein the first and second outer terminals and the first and second outer connecting conductors are provided in a pair, respectively.

3. The multilayer capacitor of claim 2, wherein the first and second outer electrodes and the first and second outer connecting conductors are arranged such that corresponding ones of the outer terminals and outer connecting conductors having identical polarity are disposed on the first and second surfaces, respectively to oppose each other.

4. The multilayer capacitor of claim 2, wherein the first and second outer terminals and the first and second outer connecting conductors are arranged such that corresponding ones of the outer terminals and outer connecting conductors having different polarities are disposed on the first and second surfaces, respectively to oppose each other.

5. The multilayer capacitor of claim 1, wherein a total number of the first and second outer terminals is identical to a total number of the first and second outer connecting conductors, and the total number comprises at least three, respectively.

6. The multilayer capacitor of claim 5, wherein the first and second outer terminals and the first and second outer connecting conductors are arranged such that corresponding ones of the outer terminals and outer connecting conductors having different polarities adjoin each other on a corresponding one of the surfaces.

7. The multilayer capacitor of claim 6, wherein the first and second outer terminals and the first and second outer connecting conductors are arranged such that corresponding ones of the outer terminals and outer connecting conductors having identical polarity are disposed on the first and second surfaces, respectively to oppose each other.

8. The multilayer capacitor of claim 6, wherein the first and second outer terminals and the first and second outer connecting conductors are arranged such that corresponding ones of the outer terminals and outer connecting conductors having different polarities are disposed on the first and second surfaces, respectively to oppose each other.

9. The multilayer capacitor of claim 1, wherein a total number of the first and second outer terminals is different from a total number of the first and second outer connecting conductors.

10. The multilayer capacitor of claim 1, wherein the first and second inner connecting conductors have an overlapping area corresponding to an overlapping area between the first and second inner electrodes.

11. The multilayer capacitor of claim 1, wherein the capacitor body has a thickness smaller than a length and a width thereof, respectively.

12. The multilayer capacitor of claim 11, wherein the capacitor body has a length greater than a width thereof, and
the capacitor body has the plurality of dielectric layers laminated in a width direction thereof.

13. The multilayer capacitor of claim 11, wherein the capacitor body has a length greater than a width thereof, and
the capacitor body has the plurality of dielectric layers laminated in a length direction thereof.

14. The multilayer capacitor of claim 1, wherein the first and second outer electrodes each are extended to a portion of a side surface of the capacitor body so as to be electrically insulated from each other.

15. The multilayer capacitor of claim 1, wherein the at least one first and second inner connecting conductors comprise a plurality of first and second inner connecting conductors.

16. A multilayer capacitor comprising:
a capacitor body where a plurality of dielectric layers are laminated, the capacitor body including first and second surfaces opposing each other, wherein one of the first and second surfaces provides a mounting surface;
a plurality of first and second inner electrodes arranged alternately to have different polarities opposing each other, while interposing a corresponding one of the dielectric layers, respectively;
an inner connecting conductor having at least one polarity disposed adjacent to a corresponding one of the inner electrodes having different polarity, while interposing a corresponding one of the dielectric layers; and
a plurality of first and second outer electrodes formed on an outer surface of the capacitor body,
wherein the plurality of first and second outer electrodes are formed such that at least respective ones of the first and second outer electrodes are disposed on the first and second surfaces of the capacitor body, respectively,
wherein a corresponding one of the inner electrodes having identical polarity to the inner connecting conductor comprises first and second groups each including at least one inner electrode,
wherein the inner electrode belonging to the first group is connected to a corresponding one of the outer electrodes having identical polarity formed on the first surface, and the inner electrode belonging to the second group is connected to a corresponding one of the outer electrodes having identical polarity formed on the second surface,
wherein the first and second surfaces are opposing each other in a direction in which the plurality of the first and second outer electrodes are connected to at least one of the plurality of first and second inner electrodes and the inner connecting conductor, and the direction is intersected with a laminated direction of the plurality of the first and second inner electrodes and inner connecting conductor,
wherein the inner connecting conductor of the at least one polarity comprises at least one first and second inner connecting conductors, the plurality of first and second inner electrodes comprise first and second groups each including at least respective ones of the first and second inner electrodes, and
wherein the first and second inner electrodes belonging to the first group are connected to the first and second outer electrodes formed on the first surface, respectively and the first and second inner electrodes belonging to the second group are connected to the first and second outer electrodes formed on the second surface, respectively.

17. The multilayer capacitor of claim 16, wherein the first and second inner electrodes of the first and second groups comprise an identical number, respectively.

18. The multilayer capacitor of claim 17, wherein the first and second inner electrodes are connected to the first and second outer electrodes formed on the first surface and the first and second outer electrodes formed on the second surface, respectively, in a symmetrical configuration with each other.

19. The multilayer capacitor of claim 16, wherein equivalent series inductance and equivalent series resistance values obtained when the first and second outer electrodes formed on the first surface are connected to power lines are identical to equivalent series inductance and equivalent series resistance values obtained when the first and second outer electrodes formed on the second surface opposing the first and second outer electrodes are connected to the power lines.

20. The multilayer capacitor of claim 16, wherein the first and second outer electrodes are provided in a pair on the first and second surfaces, respectively.

21. The multilayer capacitor of claim 20, wherein the first and second outer electrodes are arranged such that corresponding ones of the outer electrodes of identical polarity are disposed on the first and second surfaces, respectively.

22. The multilayer capacitor of claim 20, wherein the first and second outer electrodes are arranged such that corresponding ones of the outer electrodes of different polarities are disposed on the first and second surfaces, respectively to oppose each other.

23. The multilayer capacitor of claim 16, wherein a total number of the first and second outer electrodes formed on the first surface is identical to a total number of the first and second outer electrodes formed on the second surface, wherein the total number comprises at least three, respectively.

24. The multilayer capacitor of claim 23, wherein the first and second outer electrodes are arranged alternately such that corresponding ones of the outer electrodes having different polarities adjoin each other on a corresponding one of the surfaces on which the first and second outer electrodes are disposed.

25. The multilayer capacitor of claim 24, wherein the first and second outer electrodes are arranged such that corresponding ones of the outer electrodes having identical polarity are disposed on the first and second surfaces, respectively to oppose each other.

26. The multilayer capacitor of claim 24, wherein the first and second outer electrodes are arranged such that corresponding ones of the outer electrodes with different polarities are disposed on the first and second surfaces, respectively to oppose each other.

27. The multilayer capacitor of claim 16, wherein a total number of the first and second outer electrodes formed on the first surface is different from a total number of the first and second outer electrodes formed on the second surface.

28. The multilayer capacitor of claim 16, wherein the first and second inner connecting conductors have an overlapping area corresponding to an overlapping area between the first and second inner electrodes.

29. The multilayer capacitor of claim 16, wherein the capacitor body has a thickness smaller than a length and a width thereof, respectively.

30. The multilayer capacitor of claim 29, wherein the capacitor body has a length greater than a width thereof, and the capacitor body has the plurality of dielectric layers laminated in a width direction thereof.

31. The multilayer capacitor of claim 29, wherein the capacitor body has a length greater than a width thereof, and the capacitor body has the plurality of dielectric layers laminated in a length direction thereof.

32. The multilayer capacitor of claim 16, wherein the first and second outer electrodes each are extended to a portion of a side surface of the capacitor body so as to be electrically insulated from each other.

33. The multilayer capacitor of claim 16, wherein the at least one first and second inner connecting conductors comprise a plurality of first and second inner connecting conductors.

34. A multilayer capacitor comprising:
a capacitor body where a plurality of dielectric layers are laminated, the capacitor body including first and second surfaces opposing each other, wherein the first surface provides a mounting surface;
a plurality of first and second inner electrodes arranged alternately to have different polarities opposing each other, while interposing a corresponding one of the dielectric layers, respectively;
an inner connecting conductor having at least one polarity disposed adjacent to a corresponding one of the inner electrodes having different polarity, while interposing a corresponding one of the dielectric layers; and
a plurality of first and second outer electrodes formed on an outer surface of the capacitor body,
wherein the plurality of first and second outer electrodes are formed such that at least respective ones of the first and second outer electrodes are disposed on the first and second surfaces of the capacitor body, respectively,
wherein the inner connecting conductor is connected to corresponding ones of the outer electrodes of identical polarity formed on the first and second surfaces, respectively,
wherein some portions of the inner electrodes having identical polarity to the inner connecting conductor are connected to corresponding ones of the outer electrodes of identical polarity formed on the first surface and the other portions of the inner electrodes are connected to corresponding ones of the outer electrodes of identical polarity formed on the second surface, and equivalent series inductance and equivalent series resistance values obtained when the first and second outer electrodes formed on the first surface are connected to power lines are identical to equivalent series inductance and equivalent series resistance values obtained when the first and second outer electrodes formed on the second surface opposing the first and second outer electrodes are connected to the power lines,
wherein the first and second surfaces are opposite each other in a direction in which the plurality of the first and second outer electrodes are connected to at least one of the first and second inner electrodes and the inner connecting conductor, and the direction is intersected with a laminated direction of the plurality of the first and second inner electrodes and inner connecting conductor,
wherein the inner connecting conductor of the at least one polarity comprises at least one first and second inner connecting conductors having different polarities, some portions of the first and second inner electrodes are connected to the first and second outer electrodes formed on the first surface, respectively and the other portions of the first and second inner electrodes are connected to the first and second outer electrodes formed on the second surface, respectively.

35. The multilayer capacitor of claim 34, wherein the first and second inner electrodes are connected to the first and second outer electrodes formed on the first surface and the first and second outer electrodes formed on the second surface, respectively, in a symmetrical configuration with each other.

* * * * *